United States Patent [19]

Boughton et al.

[11] Patent Number: 4,879,043

[45] Date of Patent: Nov. 7, 1989

[54] MANUFACTURE OF HIGH PURITY HYDROGEN PEROXIDE BY USING REVERSE OSMOSIS OSMOSIS

[75] Inventors: John H. Boughton, Wilmington, Del.; Ralph A. Butz, Orange, Tex.; Herman C. T. Cheng, Wilmington, Del.; Jonathan R. Dennis, Brighton, Tenn.; Brian T. Hannon, Hockessin, Del.; Janet H. Weigel, Bartlett, Tenn.

[73] Assignee: E. I. du Pont de Nemours and Company, Wilmington, Del.

[21] Appl. No.: 222,089

[22] Filed: Jul. 20, 1988

[51] Int. Cl.$^4$ ............................................... B01C 13/00
[52] U.S. Cl. ..................................... 210/651; 210/654
[58] Field of Search ............... 210/639, 651, 652, 654, 210/500.38

[56] References Cited

U.S. PATENT DOCUMENTS 4,278,548  7/1981  Bettinger et al. ................ 210/639 X
4,629,563  12/1986  Wrasidlo ..................... 210/500.38 X

FOREIGN PATENT DOCUMENTS 1222505  10/1986  Japan ................................... 210/654

Primary Examiner—Frank Spear
Attorney, Agent, or Firm—Charles E. Krukiel

[57] ABSTRACT

A reverse osmosis process for manufacturing highly-pure aqueous hydrogen peroxide. Membranes used are aromatic polyamides, polypiperazineamides, polysulfones or polyacrylonitriles.

6 Claims, No Drawings

MANUFACTURE OF HIGH PURITY HYDROGEN PEROXIDE BY USING REVERSE OSMOSIS OSMOSIS

FIELD OF THE INVENTION

This invention relates to a process for the manufacture of ultra-pure aqueous hydrogen peroxide by using reverse osmosis technology. The ultra-pure hydrogen peroxide is particularly useful in the electronics industry and the food industry.

BACKGROUND OF THE INVENTION

There is increasing need for extremely pure hydrogen peroxide in both the electronics and food industries, particularly in the electronics industry. High purity hydrogen peroxide is also used in alkaline systems and neat for etching applications.

Because of the exacting requirements of such applications, hydrogen peroxide must meet stringent purity requirements such as those set by the semiconductor industry, being substantially free of metallic and other elements that might contaminate the semiconductor workpiece or interfere with the cleaning or etching functions. Accordingly, the semiconductor industry has recommended standards which include limits on the maximum permissible concentration of over 30 individual chemical elements and on the total amount of residue left on evaporation. Common objectionable chemical elements are sodium, aluminum, phosphorus and tin. It is also general practice in the industry to pass the hydrogen peroxide through a 0.2 micron filter to remove particulate material, a time-consuming and costly step considering the filter is fine enough to screen out many colloidal materials.

Hydrogen peroxide as manufactured normally contains chemical impurities, although in low concentrations, such as Na, Pd and P, the latter usually as phosphate ion. Also since hydrogen peroxide is corrosive to many of the metallic materials of construction, it may become further contaminated in storage and transport by such common corrosion products as Fe, Cu, Mn and Cr, which are well-known catalysts for the decomposition of hydrogen peroxide. The peroxide can also become contaminated with decomposition catalysts when diluting concentrated solutions with other than multiple-distilled or deionized water.

To meet the increasing demand for high purity hydrogen peroxide, the chemical industry uses various techniques including distillation and ion-exchange-resin technology to purify (remove undesired ions) the hydrogen peroxide. Each method has its advantages and disadvantages. For example, in the case of ion exchange, certain metal ions such as sodium, iron and calcium can readily be removed by using cation exchange resins. However, some metals are not readily removed by this process because they are present as anionic complexes.

Processes are also known in the art for removing anions. U.S. Pat. No. 3,294,488 teaches using a quaternary ammonium polystyrene resin to purify hydrogen peroxide. Kawaguchi et al. (JP No. 61-28296) teach using a pyridine type anionic resin with a cationic resin to produce high purity hydrogen peroxide. Yield and purity loss due to the reactivity of the peroxide with the alkaline exchange resins and potential for explosions in the ion exchange column are limitations on these ion exchange processes.

The present development of employing reverse osmosis to purify the hydrogen peroxide avoids the yield and purity loss and safety hazard limitations present in some other purification processes.

Reverse osmosis is an easy-to-operate system that has been used extensively to purify drinking water and to concentrate materials by removing water. It has been used in the electronics industry to produce ultra-high purity water. The water passes through the membrane in these applications resulting in purified water as the permeate and in the materials in the feed water being concentrated as the concentrate. Developments in membrane technology have produced systems that meet the most stringent requirements for water purity in these applications.

Reverse osmosis has not been known to be used to purify solutions in water such as hydrogen peroxide, which typically is 5 to 50 weight percent hydrogen peroxide in water. To remove impurities from the hydrogen peroxide solution, both the water and the hydrogen peroxide, not just the water, must permeate the membrane while leaving the impurities behind.

Reverse osmosis membranes are generally known to be sensitive to attack by chemicals such as hydrogen peroxide, which is strongly oxidative particularly at high concentrations (greater than 25 weight percent). The only membrane hydrogen peroxide application known is in hydrogen peroxide solution analyzers (See U.S. Pat. No. 4,525,265 and Japanese Publication Nos. 5 7122-797, 8 1048-159, and 5 8129-245-A, for example), where the flow rate through the membrane and the concentration of the hydrogen peroxide are low and breakthrough of impurities generally is not critical.

SUMMARY OF THE INVENTION

This invention utilizes a process commonly called reverse osmosis to purify hydrogen peroxide. In the process, a semipermeable membrane is used to separate the impurities from the hydrogen peroxide solution ("feed"), resulting in a purified hydrogen peroxide solution ("permeate") as a product and a stream containing the separated impurities ("concentrate"). The concentrate may be recycled for further processing or may be used in applications requiring a lower level of purity.

Specifically, the feed which contains undesired metal ionic species and other impurities such as phosphate, nitrate and sulfate ions and organic carbon compounds is forced through a suitable reverse osmosis semipermeable membrane under pressure to reduce the impurity concentrations by one or more orders of magnitude.

Since the objective of the invention is to purify hydrogen peroxide solution, the membrane should have about the same permeability for hydrogen peroxide as for water so that the assay of the hydrogen peroxide feed and that of the permeate are about the same. Slightly higher or lower permeability would be within the range of equivalents envisioned. If the permeability for hydrogen peroxide is greater than that for water, some concentration of the solution will also occur. That is, the permeate will be a higher wt. % hydrogen peroxide than the feed. If the permeability is lower, some dilution of the solution will occur. The desirability or acceptability of concentration or dilution will depend on the intended use of the hydrogen peroxide.

The membrane and its support should be sufficiently resistant to chemical attack by the hydrogen peroxide to provide an economic reverse osmosis membrane service life, defined as the length of service time beyond which it is more economical to replace the membrane than to continue to use it. This service life is dependent on a large number of factors, including the chemical and physical properties of the process stream being treated, purity requirements and the value-in-use of the final product, productivity requirements, membrane replacement costs and costs of operating and maintaining the system before and after replacement. Preferably, the service life should be greater than seven days of continuous operation.

The membrane and its support also should be made of a material that does not catalyze decomposition of hydrogen peroxide.

Preferred membranes include those made from aromatic polyamides, polypiperazineamides, polysulfones and polyacrylonitriles. The supports (modules) for the membranes preferably should be constructed of a wound fiberglass filament epoxy shell.

DETAILED DESCRIPTION OF THE INVENTION

The invention relates to a process employing reverse osmosis technology for the manufacture of a high purity aqueous hydrogen peroxide ($H_2O_2$) suitable for use in circumstances, such as electronics industry and certain food-grade applications, requiring high purity hydrogen peroxide. This high purity hydrogen peroxide is commonly referred to as electronic-grade hydrogen peroxide in the semiconductor industry. The aqueous $H_2O_2$ product of the process will normally contain 25 to 35 weight percent $H_2O_2$ but for the purposes of this invention may contain as low as about 5 percent and as high as 50 percent $H_2O_2$. It will be substantially free of metallic ions, particularly tin, sodium and phosphorus and non-metallic ions, particularly nitrate, chloride, fluoride and sulfate ions. Carbonaceous material will be reduced to the extent that the $H_2O_2$ filtered though an 0.2 micron filter leaves a residue of no more than 20 mg/liter (20 ppm by weight) upon evaporation.

The aqueous $H_2O_2$ product is normally acidic, and for the purposes of this invention can have a pH between about 1 and 6, preferably 2 to 5, more preferably 3.5 to 4.5. The lower pH's can be attained if necessary by the addition of an acid such as sulfuric, nitric or phosphoric, provided the quantity of the thus-imparted counter ion is acceptable in the end use. Also, if desired, higher pH's can be attained for use in alkaline peroxide applications by the addition of a suitable base, such as ammonium hydroxide, sodium hydroxide or sodium silicate, provided the quantity of metallic and non-volatile material so introduced is acceptable in the end use.

In a preferred embodiment, the $H_2O_2$ will conform to the proposed standards of the Semiconductor and Equipment and Materials International ("SEMI"). The SEMI standards proposed as of 8/6/87 are tabulated below in Table A and are adopted herein as further defining electronic-grade $H_2O_2$ for the purposes of this invention. In some circumstances, certain ions may be present in higher concentrations than proposed by SEMI. For example, $H_2O_2$ designated for piranha bath use may have a greater sulfate ion content than that proposed by SEMI. In general, however, the SEMI specifications are the upper limits of an acceptable range of values. The emphasis has been and is expected to continue to be on achieving zero levels of contamination.

TABLE A

| SEMI Standard For Hydrogen Peroxide | |
|---|---|
| Specifications: | |
| Assay ($H_2O_2$) | 30.0–32.0 wt % |
| Color (APHA) | 10 max. |
| Free Acid | 0.6 µeq/g max. |
| Residue After Evaporation | 20.0 ppm max. |
| Chloride (Cl) | 2.0 ppm max. |
| Sulfate ($SO_4$) | 5.0 ppm max. |
| Aluminum (Al) | 1.0 ppm max. |
| Antimony (Sb) | .01 ppm max. |
| Arsenic (As) | .01 ppm max. |
| Barium (Ba) | .05 ppm max. |
| Beryllium (Be) | .05 ppm max. |
| Bismuth (Bi) | .05 ppm max. |
| Boron (B) | .10 ppm max. |
| Cadmium (Cd) | .05 ppm max. |
| Calcium (Ca) | .20 ppm max. |
| Chromium (Cr) | .05 ppm max. |
| Cobalt (Co) | .05 ppm max. |
| Copper (Cu) | .05 ppm max. |
| Gallium (Ga) | .05 ppm max. |
| Germanium (Ge) | .50 ppm max. |
| Gold (Au) | .01 ppm max. |
| Iron (Fe) | .10 ppm max. |
| Lead (Pb) | .10 ppm max. |
| Lithium (Li) | .20 ppm max. |
| Magnesium (Mg) | .10 ppm max. |
| Manganese (Mn) | .05 ppm max. |
| Molybdenum (Mo) | .05 ppm max. |
| Nickel (Ni) | .05 ppm max. |
| Phosphorus (P) | 1.8 ppm max. |
| Potassium (K) | 1.0 ppm max. |
| Silicon (Si) | .50 ppm max. |
| Silver (Ag) | .05 ppm max. |
| Sodium (Na) | 1.0 ppm max. |
| Strontium (Sr) | .05 ppm max. |
| Tantalum (Ta) | .10 ppm max. |
| Tin (Sn) | 1.0 ppm max. |
| Titanium (Ti) | .05 ppm max. |
| Vanadium (V) | .05 ppm max. |
| Zinc (Zn) | .10 ppm max. |
| Zirconium (Zr) | .05 ppm max. |

In the process of this invention, the hydrogen peroxide solution needing purification (feed) is pressurized and forced through one or more semipermeable membranes. Purified hydrogen peroxide solution (permeate) passes through the membrane while impurities in solution which do not pass through (concentrate) are removed from the feed side of the membrane.

The membrane should be constructed and/or housed in such a manner that the feed contacts only one side of the membrane. The other side of the membrane should be connected to or incorporated into a permeate collection system held at relatively low pressure such that there is a pressure differential across the membrane.

The membrane is normally housed in some type of module or containment system to provide the needed separation of the feed and permeate streams. Cross contamination of these streams can severely degrade the product purity. These membrane-module systems can be in many forms, including hollow fiber modules, plate-and-frame systems, tubular systems and spiral wound modules.

Two or more membrane-module systems may be manifolded in parallel to form a larger membrane system, permitting increased flow rates resulting in higher total production rates.

Two or more membrane-module systems may be manifolded in series with either the concentrate from one being fed to another (often referred to as "brine staging" or "concentrate staging") or the permeate of one being fed to another (often referred to as "product staging"). Brine staging is used to increase the overall conversion of the feed stream to ultra-pure hydrogen peroxide. Product staging is used to increase product purity.

These types of systems may be combined to various manners to form larger systems with increased productivity, higher conversion of feed material to ultra-pure permeate and purer product.

The membrane for this process is chosen such that it will allow the hydrogen peroxide and water molecules to permeate while preventing a significant fraction of the impurities from passing through, thereby affecting a separation. The hydrogen peroxide and water molecules preferably should permeate at about the same rate so that the resulting purified hydrogen peroxide solution has about the same concentration as the feed. The permeability of the hydrogen peroxide molecules may be slightly greater or slightly less than that of the water molecules depending on end-use.

The impurities rejected by the membrane include ionic species, nonionic species and particulates. These are rejected to varying degrees depending on the membrane employed. Careful choosing of the membrane is necessary to get acceptable hydrogen peroxide solution permeation rates while rejecting sufficient impurities to get the desired purity improvement.

The membrane material and the support and containment materials should be sufficiently resistant to chemical attack from the hydrogen peroxide to provide an economical system life, preferably more than seven days. The membrane material also should not catalyze hydrogen peroxide decomposition.

Examples of chemical classes of membranes that are suitable for this type of service include, but are not limited to, aromatic polyamide, polypiperazineamide, polysulfone, and polyacrylonitrile.

Preferably the modules, piping and other equipment in the system should be made of materials that do not contaminate or recontaminate the product with impurities from the system, such as corrosion products. Preferred materials of construction are high density polyethylene (HDPE), Teflon ® perfluoroalkoxy (PFA), Teflon ® tetrafluoroethylene (PTFE), wound fiberglass filament epoxy, and Tefzel ® ethylene tetrafluoroethylene.

Since membranes are generally shipped in solutions containing sodium metabisulfite, sodium chloride and glycerine, they should be preconditioned prior to use. Otherwise, undesirable ions remaining in the membrane from the shipping solution may be forced out of the membrane into the permeate, resulting in an unsatisfactory product. Preconditioning can be done by flushing the membranes with water, preferably 2 megaohm water, for 24 hours at a water feed temperature of at least 25° C.; a water feed pressure of about 200 to 600 pounds per square inch gauge (psig), more preferably at 400 psig; and a flow rate of about 10 gpm per module.

The feed pressure should be such that the differential across the membrane is between 100 and 1500 pounds per square inch (psi). The optimum pressure differential depends on the membrane used and system design parameters but is typically between 200 and 1200 psi, and most preferably between 300 and 650 psi. It is preferable to maintain the permeate side of the membrane at a pressure of atmospheric to 100 psig, most preferably at a pressure of atmospheric to 20 psig. It can be placed under vacuum, but little benefit is gained thereby.

The temperature of the feed stream should be between 0° and 100° C. and preferably between 0° and 45° C., and more preferably between 15° and 25° C. for most membrane systems. The choice of membrane and module system will limit the operating range of the process.

The pH of the feed should be between 1 and 6, preferably between 2 and 5, and more preferably between 3.5 and 4.5. Higher pH's, while within the scope of this invention, are not preferred since alkaline hydrogen peroxide is more oxidative and would shorten the service life of the membrane.

A portion of the hydrogen peroxide and water will permeate through the membrane and be collected as a "permeate" stream. The impurity levels in the permeate generally will be much lower than in the feed stream due to the rejection of impurities by the semipermeable membrane. This permeate is the product stream. It can be used as is, or subjected to further treatment to reduce the impurity levels even more, including additional stages of reverse osmosis (membrane-module systems in series).

A "concentrate" stream is removed from the feed side of the membrane. This stream contains the impurities that did not permeate through the membrane as well as a portion of the hydrogen peroxide solution. This concentrate generally has higher levels of impurities than the feed stream. It can be recycled or further processed to reduce its impurity level and/or reclaim more of the peroxide as higher purity product. This further processing can include additional treatment by reverse osmosis.

It should be noted that some impurities may be trapped in the membrane and may from time-to-time break through the membrane, in which case, the permeate may contain more impurities than the feed for a short time. For example, if the preconditioning is insufficient, more sodium ions may be found in the permeate than in the feed. Likewise, certain ions may stay in the system and not enter the concentrate, thus, a sample of concentrate may, at a given time, have less of that ion than the feed.

The following Examples illustrate the invention. Concentrations are expressed as percentages, parts per billion or parts per million, each by weight. Concentrations of elements were determined by Inductively Coupled Atomic Photoemission Spectroscopy. Concentrations of anions were determined by Ion Chromatography. Assays of hydrogen peroxide and free acid were determined by titration using a permanganate indicator.

EXAMPLE 1

Commercially available hydrogen peroxide (Du Pont Albone ® 35, 35% $H_2O_2$) was pumped at a rate of 3 gpm (11.4 liters per minute) from a storage container to a high pressure pump. The pressure was increased to 250 psig, and the hydrogen peroxide was passed through a heat exchanger to control the temperature at 25° C. and once through a laboratory reverse osmosis unit approximately 6 centimeters (cm) by 50 cm. The membrane housed in the laboratory unit was a Du Pont Permasep ® B-10 polyamide membrane. The permeate flow was 120 milliliters per minute (ml/min) from the module, with the balance of the feed being returned to the system as concentrate. The feed and the permeate were analyzed for specific ions using atomic absorption. Even at the high impurity levels of the feed, product approaching the SEMI standards was made. Higher purity could have been obtained by feeding the permeate to another reverse osmosis unit or by starting with a higher quality feed such as Du Pont Perone ®. Analyses of the samples from this experiment are presented in Table B.

TABLE B

| Species | Feed Conc ppb | Permeate Conc ppb | Percent Reduction |
|---|---|---|---|
| Al | 892 | 7 | 99.2 |
| Ca | 1836 | 37 | 98.0 |
| Cr | 333 | 9 | 97.3 |
| Fe | 2118 | ND* | 99.9+ |
| K | 273 | 157 | 42.5 |
| Na | 80145 | 3920 | 95.1 |
| P | 41010 | 128 | 99.7 |
| Zn | 347 | 3 | 99.1 |
| Sn | 58280 | 77 | 99.9 |
| Si | 146 | 47 | 67.8 |
| Cl | 33900 | 660 | 88.1 |
| PO4 | 130200 | 470 | 99.6 |
| NO3 | 172700 | 2110 | 98.8 |
| SO4 | 2300 | 360 | 84.3 |
| Total Carbon | 95840 | 17400 | 81.8 |

*Not detectable, lower detection limit of 2 ppb.

EXAMPLE 2

Sufficient sodium bromide (NaBr) was added to pure hydrogen peroxide (Du Pont Perone ®) so that the NaBr concentration of the hydrogen peroxide was 40 ppm. In a manner similar to Example 1, this spiked hydrogen peroxide was fed to a laboratory unit equipped with a Millipore Model PSRO polysulfone membrane at a pressure of 400 psi and a temperature of 25° C. Based on sodium analyses, membrane efficiency was 90%, that is, the permeate contained 90% less sodium ion than the feed.

EXAMPLE 3

Example 2 was repeated using a Model FT-30 polyamide membrane supplied by Millipore. Based on sodium analysis, the membrane efficiency was 90%.

EXAMPLE 4

This example was run to determine the effect on removal of ions specified in Table C by a FilmTec NF-40 polypiperazineamide membrane after the membrane was soaked for an extended period of time (4 weeks) in the nominal 35 weight percent Albone ® hydrogen peroxide to be pumped through the membrane. The example was then run according to the procedure of Example 1. Analyses are in Table C.

TABLE C

AFTER 4 WEEKS

| ELEMENTS | DETECTION LIMITS (PPB) | FEED (PPB) | PERMEATE (PPB) | PERCENT REDUCTION |
|---|---|---|---|---|
| ALUMINUM | 27 | 718 | 70 | 90 |
| BARIUM | 1 | 10 | 4 | 60 |
| CALCIUM | 1 | 1039 | 171 | 84 |
| CHROMIUM | 3 | 358 | 17 | 95 |
| COPPER | 1 | 174 | 5 | 97 |
| IRON | 2 | 1660 | 32 | 98 |
| POTASSIUM | 72 | 295 | 177 | 40 |
| LITHIUM | 2 | 11 | 9 | 18 |
| MAGNESIUM | 1 | 375 | 61 | 84 |
| MANGANESE | 1 | 14 | 1 | 93 |
| SODIUM | 15 | 38,496 | 22,584 | 41 |
| NICKEL | 9 | 74 | 22 | 70 |
| PHOSPHOROUS | 30 | 27,873 | 1142 | 96 |
| TIN | 10 | 28,054 | 68 | 99 |

TABLE C-continued

AFTER 4 WEEKS

| SILICON | 6 (PPM) | 36 (PPM) | 13 PPM) | 64 |
|---|---|---|---|---|
| FLUORINE | — | 3.5 | 2.3 | 34 |
| CHLORINE | 0.05 | 32.5 | 19.4 | 40 |
| PHOSPHATE | 0.1 | 90.3 | 4.1 | 95 |
| NITRATE | 0.1 | 42.2 | 34.2 | 19 |
| SULFATE | 0.1 | 1.4 | 3.2 | (29) |
| TOC | 0.3 | 54.3 | 38.1 | 30 |

EXAMPLE 5

This example was run to determine the effect of continuous flow of hydrogen peroxide through a reverse osmosis unit. The test was run over a 14 day period of time. The fresh crude aqueous hydrogen peroxide (about 37% hydrogen peroxide) used in the test is normally of very high quality, but periodically sodium pyrophosphate is added. The data presented in Table D compare the effectiveness of the membrane on the second day and the fourteenth day, the days following the two sodium pyrophosphate additions made during the period. Throughout the period of operation, the assays (weight %) of hydrogen peroxide in the feed and in the permeate remained about equal to each other. Table D indicates that the assays were not measured on day 14. They were measured through day 10 by which time it had been established that the feed and permeate assays remained about equal to each other.

Crude hydrogen peroxide, manufactured by the alkylanthraquinone process, was fed from storage at 20 psig to CAT Model 1051 plunger pump capable of pumping 10 gallons of water per minute at 2000 psig. The manifold, adaptors, valves and seal cases were 316 stainless steel and the plunger was ceramic. This pump raised the pressure to 460 psig. The feed rate was 7 gpm to the modules (two in parallel) and the temperature was 25° C. The modules, which were 5.625 inches outside diameter by 48.5 inches long and constructed of wound fiberglass filament epoxy shell, contained a Du Pont Permasep ® Model B-10 fine, hollow fiber aramid (polyamide) membrane with a very thin, dense film at the surface. The discharge from the membranes was 3.5 gpm permeate at less than 20 psi.

TABLE D

| ELEMENTS | DAY 2 | | | |
| | DETECTION LIMITS (PPB) | FEED (PPB) | PERMEATE (PPB) | PERCENT REDUCTION |
|---|---|---|---|---|
| ALUMINUM | 27 | 105 | 27 | 73.4 |
| BARIUM | 1 | 1 | 0 | — |
| CALCIUM | 1 | 6 | 11 | (83.3) |
| CHROMIUM | 3 | 11 | 3 | 72.7 |
| COPPER | 1 | 4 | 1 | 72.7 |
| IRON | 2 | 7 | 2 | 71.4 |
| POTASSIUM | 72 | 281 | 71 | 74.7 |
| LITHIUM | 2 | 7 | 2 | 71.4 |
| MAGNESIUM | 1 | 0 | 19 | — |
| MANGANESE | 1 | 1 | 0 | — |
| SODIUM | 15 | 24,435 | 878 | 96.4 |
| NICKEL | 9 | ? | 9 | — |
| PHOSPHOROUS | 30 | 40,854 | 3,241 | 92.1 |
| TIN | 10 | 35 | 9 | 79.5 |
| SILICON | 6 | 25 | 6 | 76.0 |
| | (PPM) | (PPM) | (PPM) | |
| FLUORINE | — | — | — | — |
| CHLORINE | 0.05 | 0.09 | 0.04 | 55.5 |
| PHOSPHATE | 0.1 | 0.51 | 0.89 | (74.5) |

TABLE D-continued

| | | | | |
|---|---|---|---|---|
| NITRATE | 0.1 | 1.49 | 0.34 | 77.1 |
| SULFATE | 0.1 | 2.43 | 0.45 | 81.5 |
| TOC | 0.3 | 130 | 18 | 85.1 |
| ASSAY (weight %) | | 36.3 | 36.2 | |
| FREE ACID | | 24 | 9 | |
| pH | | 2.72 | 3.34 | |

DAY 14

| ELEMENTS | DETECTION LIMITS (PPB) | FEED (PPB) | PERMEATE (PPB) | PERCENT REDUCTION |
|---|---|---|---|---|
| ALUMINUM | 27 | 107 | 154 | (43.9) |
| BARIUM | 1 | 1 | 0 | — |
| CALCIUM | 1 | 143 | 46 | 67.8 |
| CHROMIUM | 3 | 16 | 4 | 75.0 |
| COPPER | 1 | 1 | 1 | — |
| IRON | 2 | 34 | 27 | 20.6 |
| POTASSIUM | 72 | 70 | 70 | — |
| LITHIUM | 2 | 2 | 2 | — |
| MAGNESIUM | 1 | 36 | 16 | 55.5 |
| MANGANESE | 1 | 1 | 0 | — |
| SODIUM | 15 | 35,312 | 10,348 | 70.7 |
| NICKEL | 9 | 9 | 9 | — |
| PHOSPHOROUS | 30 | 56,157 | 12,585 | 77.6 |
| TIN | 10 | 15 | 9 | 40.0 |
| SILICON | 6 | 6 | 6 | — |
| | (PPM) | (PPM) | (PPM) | |
| FLUORINE | — | — | — | — |
| CHLORINE | 0.05 | 0.04 | 0.03 | — |
| PHOSPHATE | 0.1 | 9.23 | 3.11 | 66.3 |
| NITRATE | 0.1 | 0.87 | 0.56 | 35.6 |
| SULFATE | 0.1 | 0.50 | 0.62 | (24.0) |
| TOC | 0.3 | 130 | 125 | 3.8 |
| ASSAY (weight %) | | N.M.* | N.M.* | |

*Not measured.

We claim:

1. A process for the manufacture of high purity aqueous hydrogen peroxide (permeate) in which ionic impurities and organic carbon compounds are removed from an aqueous solution thereof in which the concentration of hydrogen peroxide is from 5 to 50 weight percent comprising
    (a) feeding said solution to a reverse osmosis apparatus having a suitable semipermeable membrane selected from an aromatic polyamide, a polypiperazineamide or a polyacrylonitrile positioned therein at a sufficiently higher pressure to force the hydrogen peroxide solution through the membrane,
    (b) removing said impurities and carbon compounds that do not permeate the membrane (concentrate), and
    (c) removing the high purity aqueous hydrogen peroxide solution (permeate).

2. An improved method for separating ionic impurities and organic carbon compounds from an aqueous solution of hydrogen peroxide having a concentration from about 5 to 50 weight percent which comprises forcing said solution through a semipermeable reverse osmosis membrane selected from an aromatic polyamide, a polypiperazineamide or a polyacrylonitrile.

3. The improved method of claim 2 wherein the solution is forced through the membrane at a pressure which results in a pressure differential across the membrane between about 100 and 1500 psi.

4. The improved method of claim 2 in which said ionic impurities comprise metal ionic species and other ionic impurities selected from phosphate, nitrate, and sulfate ions.

5. The improved method of claim 2, claim 3, or claim 4 in which the solution is forced through the semipermeable reverse osmosis membrane at a temperature of from 0° to 100° C. and a pH of from 1 to 6.

6. The improved method of claim 5 in which the semipermeable reverse osmosis membrane is a polyamide.

* * * * *